Inventors:
Theodore Dreier,
Ira A. Terry,
by Lawrence R. Kempton
Their Attorney.

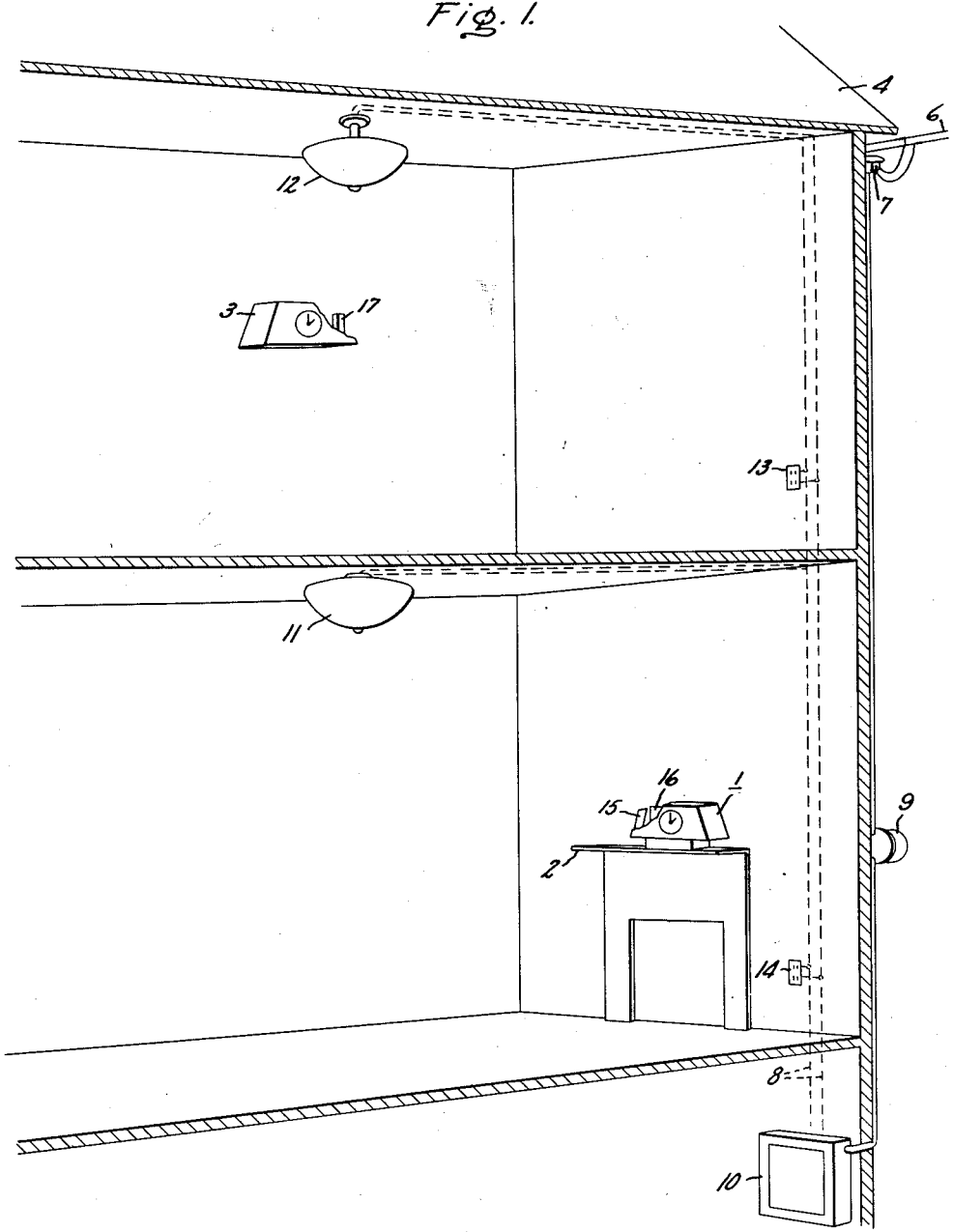

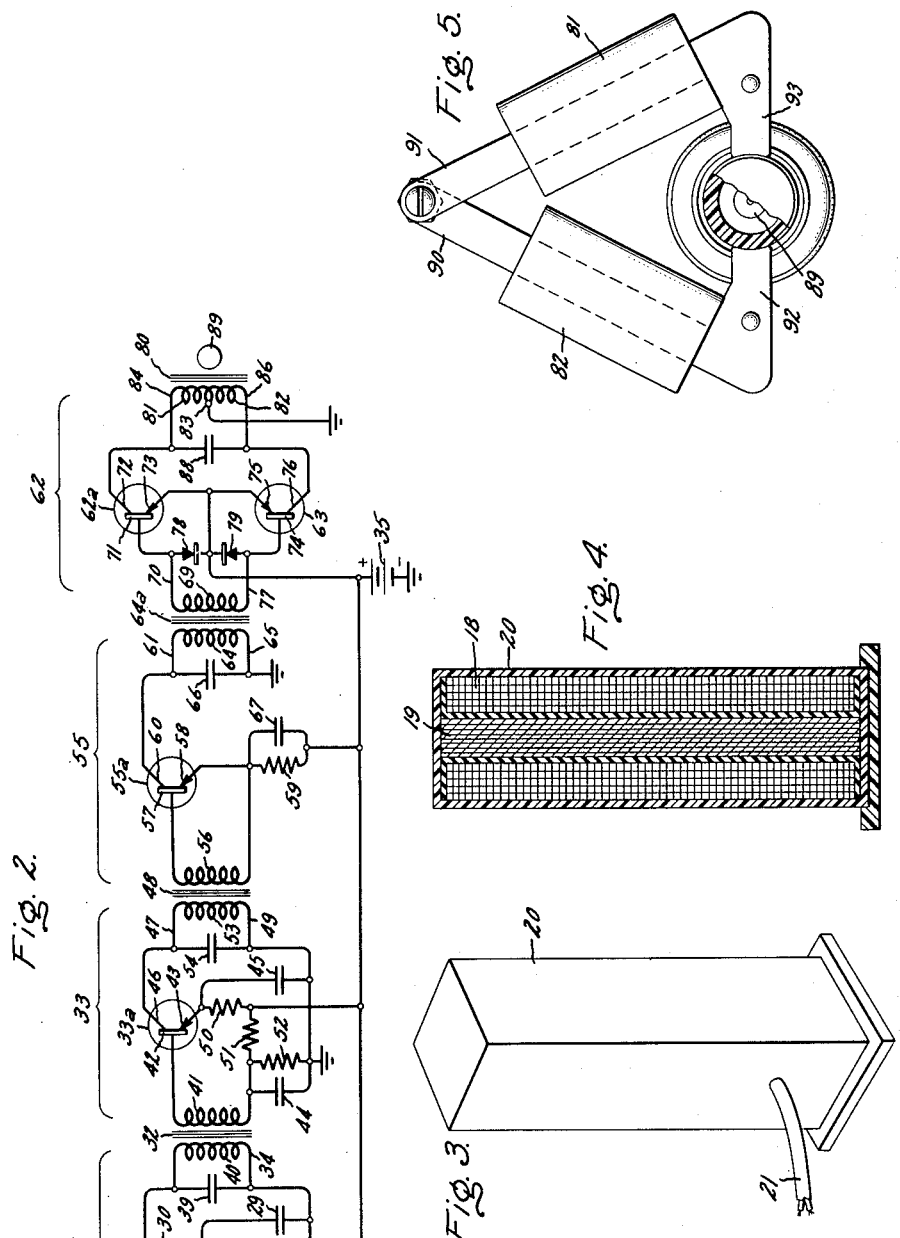

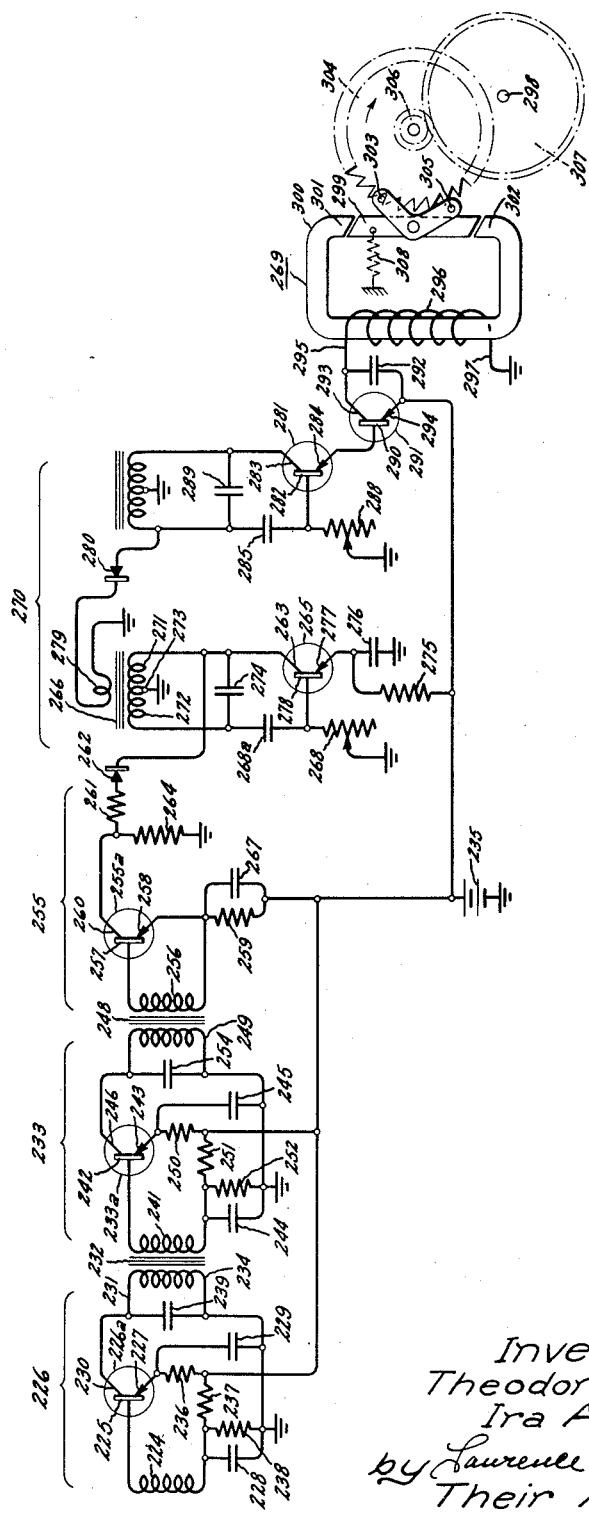

United States Patent Office 2,786,972
Patented Mar. 26, 1957

2,786,972

COMMERCIAL POWER FREQUENCY CORDLESS SYNCHRONOUS CLOCK

Theodore Dreier, Niskayuna, N. Y., and Ira A. Terry, Ashland, Mass., assignors to General Electric Company, a corporation of New York Application April 27, 1956, Serial No. 581,139

17 Claims. (Cl. 318—16)

This invention relates to timekeeping and indicating devices, and more particularly, it relates to a synchronous clock which is operated by association with a commercial alternating current power system, such as the conventional household wiring system, in such a way that the necessity for a direct electrical connection between the system and the clock is eliminated. This application is a continuation-in-part of our application Serial No. 511,017, filed May 25, 1955, now abandoned.

Today, of course, commercial alternating power provides a ready means of timekeeping by virtue of the fact that its frequency is kept relatively constant on the average by means of master horological control. Hence, clocks driven by small synchronous motors connected to commercial power outlets provide simple, but nevertheless accurate means of time indication, and are widely used. However, one advantage of radio controlled clocks, which cannot be realized with conventional synchronous motor driven electric clocks, and yet which is most often desirable, is the synchronization of the clock with master control apparatus without the need for direct physical connection therewith. Thus, in cases where no commercial power outlet is close by the place where the clock is to be situated, as on a wall or mantelpiece, the need for a long, unsightly cord would be eliminated. Furthermore, this would permit the clock to be moved about from one location to another at will. If these advantages are to be realized, however, it is apparent that the apparatus employed therefor to be practical for ordinary home or office use should not be so complex as the receiving and associated apparatus required in a radio controlled clock, but preferably, should be relatively simple and compact, entirely contained within the case of the clock, and should require very little power to operate. The present invention teaches such apparatus, thereby fulfilling this long-standing need.

Accordingly, it is an object of this invention to effect synchronization of the operation of such clocks with the commercial frequency of an ordinary alternating current power distribution system, or household power and light circuit, without the use of conductors interconnecting the clock and the power distribution system. In this way the ordinary lead cord commonly used with such clocks, and which commonly is "plugged" into the ordinary wall outlet for energization of the clock, is obviated.

A further object of this invention is to provide a cordless clock arranged to be normally synchronized through space from a prime source of power by means of an induction field pick-up device and which is arranged to operate during periods of power failure independently of the prime source of power.

It is another object of this invention to provide compact apparatus to produce locally enough alternating power to actuate a clock, the frequency of the locally-produced power being controlled by and synchronized with a small alternating voltage derived from stray fields existing in the general vicinity of low frequency commercial power lines.

Another object of this invention is to provide auxiliary means for producing an induction field in the event that the induction field produced by an ordinary power distribution system or household power circuit is of insufficient strength to be utilized by our cordless clock.

A still further object of this invention is to provide such a clock which may be moved about, or carried from room to room, without interruption of the operation of the clock, and without the inconvenience of "plugging in" or "unplugging" of any unsightly and unhandy lead cord such as is now commonly used with such electrically operated clocks.

In accord with one aspect of this invention, each clock to be synchronized is provided with a commercial frequency field-sensing element or pick-up device and an amplifier for amplification of power of ordinary low commercial frequencies. This sensing element responds to the electric induction field or the magnetic induction field of commercial frequency in space within or about the clock whenever the clock is within such distances of an energized commercial power line as are involved in ordinary household or office use of the clock, and supplies to the amplifier, voltage of the power line frequency for amplification. The amplified voltage may be supplied to the electric clock motor for operation of the clock in synchronization with the commercial frequency.

The field produced in and throughout most ordinary households by the local power distribution system is generally adequate for control of the clocks in accord with this invention. In some areas, however, where the field about the clock is too weak for operation of the clock, for reasons which may reside in the architecture of the particular building, for example, special means may be provided for connection to the power line to generate a field of the power distribution system frequency throughout the house for operation and synchronization of the clocks. Further, as a modification, each clock may be provided with a local oscillator to energize the clock motor, and such oscillator may be synchronized by the amplified output derived from the field present in or about the clock. Where the clock employs a pulse operative motive means, a frequency divider synchronized by the amplifier output may be used to generate power for operation of the pulse motive means.

Clocks constructed according to the present invention operate on either the electric induction field or the magnetic induction field of a power circuit in contrast to the radiation field. An induction field differs from a radiation field in many respects. Primarily, the induction field is predominant in the vicinity of a source, whereas the radiation field is predominant at some distance from the source. The energy of a radiation field is much greater for high frequencies than for low. The frequency of commercial power systems (usually 60 cycles in the United States), is so low that the radiation field is almost non-existent whereas both the electric and magnetic induction fields may be very strong in the immediate neighborhood of the lines (sometimes up to several hundred feet away, depending upon conditions). Outside of this range, both induction fields are so weak as to be hardly susceptible of being picked up without much greater sensitivity than is here contemplated. A radiation field represents energy that is traveling outward away from the source and that never returns to the source from which it was sent, while the energy of an induction field may return to its source. Further, an induction field originates directly from the current and charge in the source, thus clearly differing from the radiation field which originates from the changes of the induction field surrounding the source. It should be understood that an electric induction field may exist in the absence of a load current flow, whereas load current flow is required for generating a magnetic induction field.

Since the clocks constructed in accordance with this invention operate on the induction field, measurements have been made of the electric and magnetic induction fields present in a representative number of homes and offices. For example, in a particular three-bedroom ranch home, which may be considered to be typical, it was found that the electric field strength was $10^{-4}$ volts per inch, while the magnetic field strength was $\frac{1}{40}$ of a gauss in locations suitable for a clock.

By utilizing the induction field of a commercial power circuit, satisfactory control of the operation of the clock is had by means entirely practical and economical. The equipment operates at the low commercial power distribution frequency, usually 60 cycles per second, as distinct from the much higher frequencies, generally in the megacycle range, employed in radio clock control systems of the prior art. Such radio clock systems use, for example, an impressed modulation on a carrier signal and a demodulator, or extensive frequency division circuits, involving extensive complication. In accordance with this invention, such complications are avoided. The commercial frequency amplifier may be battery operated and may employ transistors such that the space requirements, including that of the battery, do not exceed the practical dimensions of a clock, and at the same time the battery may have a satisfactory, useful life, as for example, a year.

Other objects and attendant advantages of this invention will be apparent from the following description taken in connection with the drawings in which:

Fig. 1 is a diagrammatic sketch of a conventional home showing two of our cordless clocks located therein;

Fig. 2 is a circuit diagram of a power amplifier in accordance with the invention;

Fig. 3 is a perspective view of a generating coil which may be used as an auxiliary induction field generating means in accordance with the invention;

Fig. 4 is a vertical cross sectional view of the generating coil shown in Fig. 3;

Fig. 5 is a rear elevational view, partially in cross section, showing an improved synchronous motor which may be used in accordance with the invention;

Fig. 8 illustrates a further modification of the circuit shown in Fig. 2 in accordance with the invention.

Figure 6:
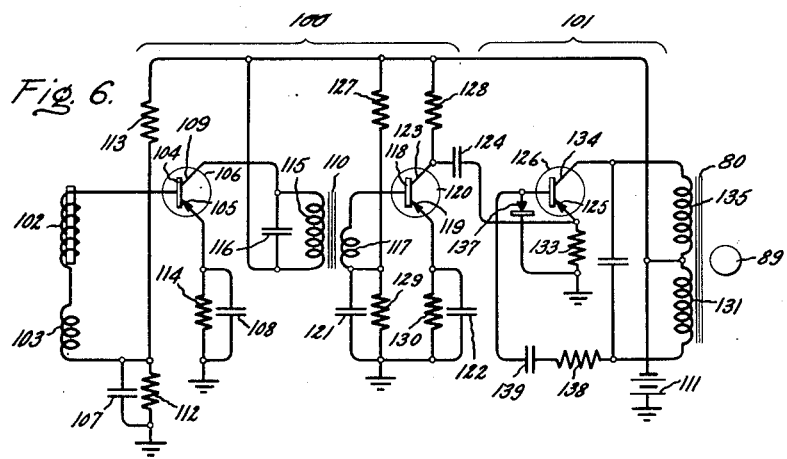
Fig. 6 is a circuit diagram showing a modification of the circuit illustrated in Fig. 2 in accordance with the invention.

Referring now to Fig. 1 of the drawing, there is illustrated a cordless clock 1 constructed in accordance with this invention supported on a mantel 2 located on the first floor of a conventional home 4. Another cordless clock 3 constructed in accordance with this invention is shown located on the second floor of house 4 and is positioned on a wall. A local power line 6 is connected to the house at 7 and extends through meter 9 to a fuse box 10 in a manner well-known in the art. Conventionally, house wiring 8 is connected to fuse box 10 and supplies power to lamps 11 and 12, and wall outlets 13 and 14, as well as other wall outlets, lamps and electrical appliances (not shown).

When current flows through house wiring 8, an electric induction field proportional to voltage and a magnetic induction field proportional to current are produced. The frequency of these induction fields corresponds with the frequency of the commercial alternating power supplied to power line 8, and usually is 60 cycles per second in the United States. Conventional clocks are provided with electrical cords which are plugged into a wall outlet for obtaining this 60 cycle power for synchronizing and energizing the clocks. Cordless clock 1 is synchronized by the field produced by this same 60 cycle power. However, in place of the electrical cord, cordless clock 1 is provided with a capacitive type pick-up which may comprise plates 15 and 16 to couple cordless clock 1 to house wiring 8 for sensing the 60 cycle electric induction field produced by house wiring 8. The specific details of the capacitive transducer pick-up device utilized in clock 1 do not form a part of this invention and are more particularly claimed and described in a copending application of Theodore Dreier and Reade Williams, application Serial No. 511,016, filed May 25, 1955, and assigned to General Electric Company, assignee of the present invention. Cordless clock 3, again to eliminate the electrical cord, is provided with a magnetic coil pick-up 17 inductively coupled to house wiring 8 for sensing the 60 cycle magnetic induction field created by a flow of current in house wiring 8. Signal-sensing devices 15—16 and 17 respond to the electric and magnetic induction fields, respectively, produced by the house wiring rather than to radiation fields as in radio. Ordinarily, in a home or office the strength of such induction fields as produced by nearby wiring will be sufficient to permit the use of any relatively simple pick-up device. However, a capacitive pick-up device which is sensitive to the electric field has an advantage since the presence of an electric field will be substantially unaffected by the amount of load current being drawn through the nearby wiring. Contrariwise, the strength of the magnetic field would be determined by the magnitude of such current, and hence the field disappears when no current is caused to flow. This would mean in a home, for example, when very little current is utilized such as in the night time, the strength of the magnetic field might become so small as to be unusable.

The small alternating voltage or signal sensed by the pick-up devices 15—16 or 17 is amplified. Owing to the desirability of keeping the amplifier size quite small so that it may be placed in a clock case of more or less conventional proportions, and in order to minimize power requirements, a battery powered transistor amplifier such as that shown in Fig. 2, has been found to be particularly well-suited for the purpose. However, other well-known amplifiers may be used in accordance with this invention. In the arrangement illustrated in Fig. 2, a magnetic pick-up coil 24 is utilized for sensing a 60 cycle magnetic field.

Referring more particularly to the illustrative circuit shown in Fig. 2, it can be seen that the power amplifier circuit broadly comprises a first amplifier stage 26 including transistor 26a, a second amplifier stage 33 including transistor 33a, an amplifier limiter stage 55 including transistor 55a, and a final power output stage 62 including transistors 62a and 63 shown, for example, in push-pull operation. Pick-up coil 24, by magnetic inductive coupling with the house wiring, derives a timing signal of commercial power frequency, for example, 60 cycles per second. This induced 60 cycle voltage from coil 24 is applied to base 25 of first stage transistor amplifier 26a and, through by-pass capacitors 28 and 29, to emitter 27. By applying the proper D. C. bias voltage from battery 35 to base 25 through resistors 37 and 38, and the proper D. C. bias current to emitter 27 through resistor 36, an amplified signal is provided from collector 30. This amplified signal from collector 30 flows through a load circuit including a primary coil 40 of interstage transformer 32 to ground. Transformer 32 is provided for coupling first amplifier stage 26 to second amplifier stage 33. Condenser 39 is chosen to resonate with the primary inductance 40 of interstage transformer 32 at the power frequency. The amplified voltage induced in secondary coil 41 of coupling transformer 32 is applied between the base 42 and the emitter 43 of second stage transistor 33a through capacitors 44 and 45. The amplified output from collector 46 of transistor 33a flows through a primary lead 47 of coupling transformer 48 to ground through the other primary lead 49. Resistors 50, 51, and 52 serve to apply proper D. C. bias to emitter 43 and base 42. Thus, a further amplified voltage appears across primary winding 53 of interstage coupling transformer 48. Condenser 54 is placed in parallel with primary winding 53 of this transformer and is chosen to resonate with the primary inductance of winding 53 at the commercial power frequency.

The third transistor amplifier stage 55 functions as a non-linear transistor amplifier-limiter. It has the ability of holding its peak output voltage fairly constant while the magnitude of its input varies over a considerable range. Such a non-linear amplifier is desirable to keep excess power from being supplied to the motor when strong fields surround the clock. Such excess power would be wasted in the motor coil and would result in decreased battery life when the clock is run over long periods in a strong field. The amplified voltage induced in secondary coil 56 of interstage transformer 48 is applied between base 57 and emitter 58 of the third stage transistor 55a.

No appreciable bias exists between base 57 and emitter 58 since both are directly connected to low resistance coil 56. At moderately small signals, class B amplification occurs in this stage with the average transistor current increasing as the input signal increases. Resistor 59, suitably by-passed by condenser 67, is provided so that this increasing transistor current in passing through resistor 59 will cause a voltage drop, reducing the effective supply voltage applied to the transistor. At very large signal levels the effective supply voltage is so small that amplification no longer occurs in this stage, and the output is substantially constant. The output of transistor 55a is applied to an output circuit including lead 61 and transformer primary coil 64 from collector 60. The opposite terminal of transformer primary 64 is grounded through lead 65. Condenser 66 is chosen to resonate with the primary inductance of coupling transformer 64a at operating frequency.

Referring now to the right-hand portion of Fig. 2, it will be observed that two transistors 62a and 63 provide a final power output stage. These transistors have a base, a collector and an emitter designated 71, 72, 73, and 74, 75, 76, respectively, and are powered by battery 35.

Coupled to a secondary coil 69 of interstage transformer 64a are the input circuits of transistors 62a and 63, which are arranged for push-pull class B amplifier operation. In particular, one of the leads 70 of the secondary coil of the interstage transformer is connected to base 71 of transistor 62a, and the other end 77 of coil 69 is connected to the base 74 of transistor 63. A pair of diodes 78 and 79 are connected from the respective bases 71 and 74 of transistors 62a and 63 to a common junction of their emitters 73 and 75, which is connected to the positive terminal of battery 35. Diode 78 serves to complete the circuit for the signal through transistor 63, and diode 79 serves to complete the circuit for the signal through transistor 62a, each acting in alternate halves of the cycle.

As shown diagrammatically in the right-hand portion of Fig. 2, a synchronous motor 80 or other means for actuating time indicating apparatus is driven by final power output stage 62 of the amplifier. This motor is shown as including a pair of like series-connected field coils 81 and 82, which are tapped at their junction 83 and grounded to the negative terminal of battery 35. Field coil 81 is energized from transistor 62a by virtue of the connection between one end 84 of coil 81 and collector 72, and the connection of junction 83 through ground to the negative terminal of the battery. Field coil 82 on the other hand, is energized by transistor 63, one end 86 being coupled to collector 76, and the common junction 83 of coil 82 being coupled to the negative terminal of battery 35 through ground. Condenser 88 is connected in parallel with the series motor coils 81 and 82 between the ends 84 and 86 thereof, and is chosen to resonate with the inductance of motor coils 81 and 82 at operating frequency.

It can be seen that collector 72 of transistor 62a will first cause current to flow in one direction through one motor coil on one-half cycle, and then collector 76 of transistor 63 will cause current to flow through the other motor coil in the opposite direction during the other half cycle, whereby to cause continued rotation of permanent magnet rotor 89.

The physical arrangement of synchronous motor 80 is more particularly shown in Fig. 5. It can be seen that field coils 81 and 82 are wound around legs 90 and 91, respectively, of a V-shaped field structure, and rotor 89 is positioned for rotation between two diametrically opposed pole pieces 92 and 93 formed integrally with legs 90 and 91, respectively. The specific details of this low power motor do not form a part of this invention, but are more particularly claimed and described in a copending application of George de Wolf, application Serial No. 561,289, filed January 25, 1956, and assigned to General Electric Company, assignee of the present invention. In practicing this invention, other small synchronous motors may be used in place of the motor shown in Fig. 5. However, in order to minimize power requirements, the motor shown in Fig. 5 is preferred.

It may be desirable to supply power to our cordless clock in the event of power system failure so that the clock may continue to operate. One way to accomplish this in accordance with the invention is to provide an oscillator in combination with the voltage amplifier. In the arrangement illustrated in Fig. 6, this comprises an oscillator 101 and a voltage amplifier 100 for supplying an amplified synchronizing signal derived from coil 102 to oscillator 101. Voltage amplifier 100 may comprise any simple conventional type of voltage amplifier consisting of electronic tubes or transistors and oscillator 101 may also be a known conventional type. However, again it is preferred that voltage amplifier 100 and oscillator 101 employ transistors so as to minimize the drain on the battery which powers them, and the specific circuit shown in Fig. 6 has been found to be well suited for this purpose. Oscillator 101 may be adapted to operate synchronously at a harmonic or sub-harmonic of the frequency of the coil-derived voltage, but it is preferred that its frequency of oscillation be the same thereas. Accordingly, where the frequency of commercial alternating power is 60 cycles, as is usually the case in the United States, oscillator 101 will have a free-running frequency of essentially 60 cycles per second; and a relatively small signal from voltage amplifier 100 will lock its frequency at 60 cycles to provide an accurately controlled frequency for power supplied to the clock motor. As is apparent, oscillator 101 furnishes sufficient power to drive motor 80 as did the power amplifier of Fig. 2. The system of Fig. 6 has the advantage that if the supply of commercial power is interrupted, motor 80 will continue to run since the battery operated oscillator will continue to function, the only difference being that the frequency of the latter may deviate slightly from 60 cycles owing to the absence of a synchronizing signal.

Referring now to the input of the circuit shown in Fig. 6, it can be seen that the 60 cycle magnetic field in the vicinity of a ferrite cored pick-up coil 102 causes a 60 cycle voltage to be induced in this coil. The function of series coil 103 will be indicated later. This induced voltage of commercial power frequency from pick-up coil 102 is applied to base 104, and emitter 105 of transistor 106 through bypass capacitors 107 and 108. The collector 109 of the transistor is connected to one primary lead of the interstage transformer 110, the other primary lead of transformer 110 being connected to the negative terminal of battery 111. Resistors 112 and 113 serve to apply the proper D. C. bias voltage to base 104 and resistor 114 supplies the proper bias current to emitter 105 of transistor 106 so that an amplified version of the voltage applied between the base 104 and the emitter 105 of transistor 106 appears at collector 109 and across the primary winding 115 of interstage coupling transformer 110. Condenser 116 is chosen to resonate with the primary inductance 115 of transformer 110 at operating frequency.

Coupling transformer 110 is provided for connecting the first amplifier stage to the second amplifier stage. The amplified current induced in secondary coil 117 is applied between base 118 and emitter 119 of transistor 120 through by-pass condensers 121 and 122. Thus, a further amplified current output appears in the collector 123 of transistor 120 and is applied through a coupling condenser 124 to the emitter 125 of transistor 126. Resistors 127 and 129 apply the proper D. C. operating voltage to base 118 of transistor 120, and resistor 130 applies the proper bias current to the emitter 119. The path for the D. C. collector current includes resistor 128. The operating point of transistor 120 is selected by the circuit parameters such that the amplified current applied to the emitter 125 of transistor 126 is limited to a certain maximum amplitude consistent with the requirements of this stage regardless of the strength of the voltage induced in the pick-up coil 102.

The third stage 101 of the circuit shown in Fig. 6 including transistor 126 is arranged to function as an oscillator tuned to provide an output of the commercial power frequency. Accordingly, output from collector 134 of transistor 126 is applied across one of the motor coils 135 through a circuit including the battery, resistor 133, the transistor, and motor coil 135. The other motor coil 131 is closely coupled magnetically with coil 135 and provides feedback to the transistor base through resistor 138 and capacitor 139. The circuit including the motor coils and capacitor 136 tends to oscillate at a resonant frequency corresponding to the commercial power frequency. A diode 137 connected between base 132 and the positive battery terminal conducts on alternate half cycles of the voltage from motor coil 131, connecting the voltage applied to the base of the transistor to the positive battery terminal. On opposite half cycles, the base of the transistor receives the feedback voltage which is amplified by the transistor and appears at the output to coil 135. Resistor 138 and capacitor 139 in the feedback circuit are adjusted for maximum stability of oscillation and adequate motor torque. Resistor 133 which is inserted between the emitter 125 of transistor 126 and the positive terminal of battery 111 also tends to stabilize the frequency of oscillation.

The frequency of oscillation of transistor 126 is synchronized at the frequency of the voltage induced in pick-up coil 102 by means of the connection through coupling condenser 124 between the emitter 125 of the oscillator 101 and the collector 123 of transistor 120. This connection causes an amplified version of the voltage induced in the pick-up coil 102 to be injected into the oscillating circuit of transistor 126. Thus, it can be seen that frequency of oscillation from oscillator 101 is stabilized by the signal derived from the commercial power source. Circuit components are selected nevertheless so that the natural frequency of oscillator 101 is substantially equal to the commercial power frequency. Hence, even upon failure of the commercial power, the clock continues to operate approximately at the proper rate.

As indicated above, coils 131 and 135 form the field coils of the permanent magnet synchronous motor which is more particularly shown, for example, in Fig. 5. The rotor 89 of this motor when started rotates in synchronism with the frequency of oscillation of the circuit of transistor 126 since coils 131 and 135 are common to both the motor and the oscillator circuit 101.

Coil 103 is provided to eliminate some undesirable coupling between pick-up coil 102 and the motor coils 131 and 135. Balancing coil 103 is placed physically near motor coils 131 and 135 and in electrical series with pick-up coil 102 to counteract any voltage component induced in coil 102 by the motor. Thus, coil 102 effectively senses only the magnetic field of the commercial power source, and the over-all circuit will be rendered more stable.

The circuit shown in Fig. 6 has an advantage over the circuit shown in Fig. 2 in that if the supply of commerical power is interrupted, by an electrical storm for example, synchronous motor 89 shown in Fig. 6 will continue to function, the only difference being that the frequency of power supplied to motor coils 131 and 135 may deviate slightly from commercial power frequency owing to the absence of the synchronous signal usually obtained from pick-up coil 102.

Figure 7:
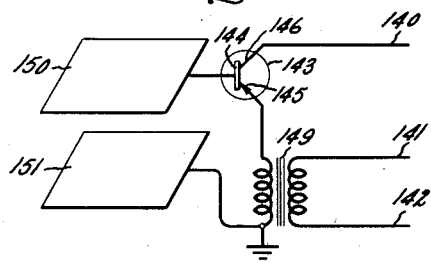
Fig. 7 is a circuit diagram of an electric field pick-up device and preamplifier in accordance with the invention.

The magnetic coil pick-up devices shown in Figs. 2, 6 and 8 may be replaced with a capacitor type pick-up device, if desired. The circuit diagram shown in Fig. 7 illustrates how such a capacitor pick-up device including plates 150 and 151 may be incorporated within the circuit diagram shown in Fig. 6. In applying this pick-up device to the circuit shown in Fig. 6, lead 140 is connected to the negative battery terminal, lead 141 is series-connected to the base 104 of transistor 106, and lead 142 is connected to the ungrounded end of parallelly-connected resistor and capacitor 107 and 112. Obviously, coils 102 and 103 are removed. In the arrangement illustrated, preamplifier transistor 143 having a base 144, an emitter 145, and collector 146 is added to the circuit to amplify the current picked up by plates 150 and 151. Transformer 149 couples the preamplifier transistor 143 to the first stage transistor amplifier 106.

With reference to Fig. 8, it will be observed that a somewhat modified form of the circuits of Figs. 2 and 6 is illustrated. According to Fig. 8, an amplified electromotive force of commercial power frequency is supplied to a frequency divider 270 to power a synchronous pulse motor 269. Frequency divider 270 may comprise any conventional type of frequency division circuit well known in the art, such as for example, a multivibrator circuit or a blocking oscillator circuit which is triggered periodically by an input voltage. As is also well known, these or other frequency division circuits may be adapted to employ transistors powered by batteries, such circuits being capable of providing at their output sufficient power to run a small synchronous actuator shown as pulse motor 269. For a commercial power supply of 60 cycles per second, frequency division by three performed twice in separate stages has been found effective, making the frequency of the pulses furnished to the clock pulse motor six and two-thirds cycles per second. With such low frequency, self-starting of the clock may be achieved easily, since the pulse motor will operate when first energized in substantially the same fashion as it does after a number of pulses have been supplied to it.

It can be seen that the first three voltage amplification stages of the circuit shown in Fig. 8 are identical to the first three stages of the circuit shown in Fig. 2, and these stages operate in the same manner as the circuit shown in Fig. 2. Reference numerals prefixed by numeral "2" have been affixed to the elements shown in the first three stages of Fig. 8 which correspond to the elements shown in the first three stages of the circuit shown in Fig. 2. The output from collector 260 of third stage transistor 255a is fed through resistor 261 and diode 262 to collector 263 of the first frequency division stage. Diode 262 provides unidirectional input pulses to the frequency division circuit. Load resistor 264 for transistor 255a is connected through ground to the negative terminal of battery 235.

The first stage of the frequency division circuit consists of a transistor 265 connected as an amplifier, a transformer 266, a capacitor 268a, and a resistor 268 connected as shown. Transformer 266 comprises two series-connected coils 271 and 272 which are tapped and grounded at their junction 273. Capacitor 274 is connected between the collector 263 and capacitor 268a for establishing the width of the pulse which is applied to capacitor 268a. A decoupling arrangement comprising a parallelly-connected capacitor 276 and resistor 275 is connected between the emitter 277 and the negative and positive poles of battery 235, respectively.

In operation, the alternating output from amplifier stage 255 is applied through resistor 261 and diode 262 and results in a series of pulses for input into the frequency divider circuit. These pulses are applied to coil 271 and causes pulses of the opposite polarity to be induced in coil 272 and applied to one side of capacitor 268a. The opposite plate of capacitor 268a supplies a voltage signal to the base 278 of transistor 265 to control conduction through this transistor. By suitably choosing the discharge time of condenser 268a through resistor 268 to ground and by correspondingly choosing the magnitude of the synchronizing voltage applied to coil 271, the circuit through emitter 277 and collector 263 of transistor 265 can be made to conduct on every second, third, or fourth pulse of synchronizing voltage as desired. In the arrangement illustrated, it is desired to accomplish frequency division by three. Hence, one output pulse passes through collector 263 for every three input pulses applied to condenser 268a. Variable resistor 268 is carefully adjusted to determine the discharge rate of capacitor 268a so that the circuit of transistor 265 only conducts on every third pulse impressed on capacitor 268a. The output pulse of collector 263 is fed through the transformer coil 271, which in turn causes a pulse to be induced in secondary coil 279 of transformer 266. One lead of secondary transformer coil 279 is connected through ground to the negative terminal of battery 235 while the other lead is connected through diode 280 to a second frequency division stage. Diode 280 provides unidirectional voltage pulses from the first to the second of the frequency division stages. The second frequency division stage is similar to the first frequency division stage and includes transistor 281 having a base 282, a collector 283 and an emitter 284. Capacitor 285, variable resistor 288 and capacitor 289 are connected as shown. This frequency division stage may be adjusted for frequency division, for example by three, in the same manner as the first stage of frequency division. Transistor 281 conducts after three synchronizing pulses are applied to capacitor 285. Output from this stage is taken through emitter 284 and is applied to the base 289 of transistor 291. Transistor 291 functions as an output transistor for pulse motor 269. Capacitor 292 is connected between the collector 293 and the emitter 294 of transistor 291 to establish the width of the pulses. One lead 295 of driving coil 296 is connected to the collector 293 of transistor 291, while the other lead 297 of coil 296 is connected through ground to the negative terminal of battery 235. The connection between emitter 294 and the positive pole of battery 235 completes the circuit.

In the arrangement illustrated on the right-hand portion of Fig. 8, a pulse motor 269 is provided for converting the pulses of electrical energy which are sent through coil 296 to mechanical motion for driving shaft 298 which may be the sweep second hand shaft of a clock mechanism. The pulse motor comprises field structure 300 having two diametrically opposed pole pieces 301 and 302. An armature 299 is pivotally mounted between the pole pieces and is normally urged by tension spring 308 to an angular position with respect to pole pieces 301 and 302. When a pulse of electrical energy is transmitted through field coil 296, the stator structure becomes energized and armature 299 pivots to an in-line position with pole pieces 301 and 302, as illustrated. When armature 299 is energized, a pallet pin 303 is disposed between the teeth of a ratchet wheel 304. When the coil 296 is deenergized, spring 308 pulls an opposite pallet pin 305 into engagement with the teeth of ratchet wheel 304, advancing it one-half tooth in the direction of the arrow. With the next pulse, pin 303 engages and drives ratchet wheel 304 one-half tooth. Thus, each complete cycle of pulse motor 269 advances ratchet wheel 304 one tooth. Suitable gearing 306 is provided between ratchet wheel 304 and gear 307 which is rigidly fixed, for example, to a sweep second hand shaft 298.

In the event that neither the electric nor the magnetic fields produced by the nearby commercial supply power media are of sufficient strength, it is contemplated according to this invention that special means to generate a field for detection by a pick-up device be provided. To this end, it has been found most convenient to create a magnetic field using alternating current from a near-by commercial power outlet such as outlet 13 shown on the second floor of house 4. A simple field generating device in the form of a coil or loop as illustrated in Figs. 3 and 4 of the drawing is well suited for this purpose. As shown in Fig. 4, the device may consist of a coil 18 wound around a laminated soft iron core 19. By way of example, coil 18 may be approximately ten inches long and may consist of 3,500 turns of Number 26 wire. If desired, coil 18 may be mounted in a plastic case 20 and may be provided with a cord set 21 so that it may be plugged into any convenient 60 cycle A. C. outlet. Alternatively, coil 18 may be provided with a male coupling member to be plugged directly into any convenient outlet. Obviously, such a field generator could be concealed within the walls of a building structure.

In operation, it will be apparent that coil 18 forms, in effect, the primary coil of a transformer which may be inductively coupled to a secondary pick-up coil, such as 24, 102 or 202 shown in Figs. 2, 6 and 8, respectively. It will be understood that a single length of wire or plate of suitable dimensions, for example, might optionally be used to produce an electric field instead, in which case a capacitive pick-up of a form shown by Fig. 7 is employed. It will, also, be understood that if the field strength in the vicinity of the clock is relatively large, the system can be designed so that its amplification power requirements will be correspondingly less.

While there has been shown and described particular embodiments of this invention, it will be obvious to those skilled in the art that various changes and modifications can be made herein without departing from the invention, and therefore, it is aimed by the appended claims to cover all such changes and modifications as fall within the true spirit and scope of the invention.

What we claim as new and desire to secure by Letters Patent of the United States is:

1. The combination, in a clock, of motor means for actuating the clock and means to synchronize said motor means with the low frequency of a power distribution system in the neighborhood of the clock without electric circuit connection therewith, said means comprising a field sensing means to pick up electromotive force from the field in space in the area where the clock is located produced by currents in said power distribution system, means for amplifying said electromotive force, and means to operate said motor means in fixed time relation with the amplified electromotive force produced by said amplifying means.

2. The combination, in a clock, of an electric motor to operate the clock, a field sensing element adapted to pick up an electromotive force of a frequency of a near-by power distribution system from the field in space in the area where the clock is located produced by said power distribution system, an amplifier connected between said field sensing element and motor to amplify said electromotive force and supply it to the motor for operation of the clock, whereby said clock operates in a fixed time relation to the frequency of said power distribution system without circuit connection therewith.

3. The combination, in a clock, of motor means for actuating the clock, and means to synchronize the motor means with the frequency of a power distribution system in the neighborhood of the clock without electric circuit connection therewith, said means comprising an inductive coil field sensing means to pick up electromotive force from the induction field in the space where the clock is located produced by currents in the power distribution system, means for amplifying said electromotive force, and means to operate said motor means in fixed time relation with the amplified electromotive force produced by said amplifying means.

4. The combination, in a clock, of motor means for actuating the clock, and means to synchronize said motor means with the frequency of a power distribution system in the neighborhood of the clock without electric circuit connection therewith, said means comprising a capacitor field sensing means to pick up electromotive force from the electric field existing in the vicinity where the clock is located produced by the power distribution system, means for amplifying said electromotive force, and means to operate said motor means in fixed time relation with the amplified electromotive force produced by said amplifying means.

5. The combination, in a clock, of motor means for actuating the clock, and means to synchronize said motor means with the frequency of a power distribution system in the neighborhood of the clock without electric circuit connection therewith, said means comprising a coil inductively coupled to the power distribution system to pick up alternating electromotive force, means connected to said coil for amplifying the electromotive force picked up by said coil, a non-linear transistor amplifier connected to said amplifying means for keeping excess power from being supplied to the clock motor when strong fields surround the clock, and a power output circuit controlled by said non-linear transistor amplifier supplying power to said motor for driving said motor in fixed time relation with the amplified electromotive force produced by said amplifying means.

6. The combination in a clock of motor means for actuating the clock and means to synchronize said motor means with the frequency of a power distribution system in the neighborhood of the clock without electric circuit connection therewith, said means comprising a field sensing means inductively coupled to the power distribution system to pick up an electromotive force of the power distribution system frequency, multiple stage transistor amplifying means connected to said field sensing means for amplifying said electromotive force, a non-linear amplifier connected to the last stage of said multiple stage amplifying means for keeping excess power from being supplied to the clock motor when strong fields surround the clock, and power supply means connected to said non-linear amplifier and to said motor for driving said motor in fixed time relation with the amplified electromotive force produced by said amplifying means.

7. The combination, in a clock, of motor means for actuating the clock, and means to synchronize the motor means with the frequency of a power distribution system in the neighborhood of the clock without electric circuit connection therewith, said means comprising a field sensing means to pick up electromotive force from the field of the power distribution system in space in the area where the clock is located, means connected to said field sensing means for amplifying the electromotive force, and transistor oscillator means connected to said amplifying means to operate said motor means in fixed time relation with the amplified electromotive force produced by said amplifying means.

8. The combination in a clock, of synchronous motor means for actuating the clock, and means to synchronize the motor means with the frequency of a power distribution system in the neighborhood of the clock without electric circuit connection therewith, said means comprising a field sensing means to pick up electromotive force from the field of the power distribution system in the area where the clock is located, means connected to said field sensing means for amplifying the electromotive force, and oscillator means connected to said amplifying means to operate said synchronous motor means in fixed time relation with the amplified electromotive force produced by said amplifying means.

9. The combination in a clock of motor means for actuating the clock, and means to synchronize the motor means with the frequency of a power distribution system in the neighborhood of the clock without electric circuit connection therewith, said means comprising a capacitor field sensing means to pick up electromotive force from the electric field existing in the vicinity where the lock is located and produced by the power distribution system, means connected to said field sensing means for amplifying the electromotive force, and oscillator means connected to said amplifying means to operate said motor means in fixed time relation with the amplified electromotive force produced by said amplifying means.

10. The combination in a clock of pulse motor means for actuating the clock, and means for actuating the motor means in accordance with the frequency of a power distribution system in the neighborhood of the clock without electric circuit connection therewith, said means comprising a field sensing means to pick up electromotive force from the field in space in the area where the clock is located produced by currents in said power distribution system, means connected to said field sensing means for amplifying the electromotive force, and oscillator means connected to said amplifying means to operate said pulse motor means in fixed time relation with the amplified electromotive force produced by said amplifying means.

11. The combination in a clock of motor means for actuating the clock, and means to synchronize the motor means with the frequency of a power distribution system in the neighborhood of the clock without electric circuit connection therewith, said means comprising a field sensing means to pick up electromotive force from the field in the space in the area where the clock is located produced by currents in the power distribution system, means connected to said field sensing means for amplifying the electromotive force, and frequency divider means connected to said amplifying means to operate said motor means in fixed time relation with the amplified electromotive force produced by said amplifying means.

12. A horological apparatus comprising a coil adapted to be connected to an alternating power distribution system for creating a fixed low frequency magnetic induction field, a clock located in the immediate vicinity of said coil, motor means connected to said clock for actuating said clock, and means to synchronize said motor means with the frequency of said magnetic field without electric circuit connection therewith, said synchronizing means comprising a field coupling means to pick up electromotive force from the field in space in the area where the clock is located produced by currents in said coil, means connected to said coupling means for amplifying said signal, and means to operate said motor means in fixed time relation with the amplified signal produced by said amplifying means.

13. A horological apparatus comprising a primary coil adapted to be connected to an alternating power distribution system for creating a substantially fixed frequency magnetic induction field in the immediate vicinity of said coil, clock means spaced from said coil in the immediate vicinity of said coil, motor means connected to said clock for actuating said clock, means to synchronize said motor means in accordance with the substantially fixed frequency of said coil without electrical circuit connection therewith, said synchronizing means comprising a secondary coil coupling means spaced from said primary coil to pick up electromotive force from said primary coil, means connected to said secondary coil for amplifying the electromotive force, and means connected to said amplifying means for operating said motor means in fixed time relation with the amplified electromotive force produced by said amplifying means.

14. The combination in a clock, of motor means for actuating the clock, and means to synchronize said motor means with the frequency of a power distribution system in the neighborhood of the clock without electric circuit connection therewith, said means comprising a primary coil electrically connected to said power distribution system, for creating a fixed frequency magnetic induction field, a secondary coil to pick up electromotive force from the primary coil in the area where the clock is located produced by currents in said primary coil, means for amplifying said electromotive force, and means to operate said motor means in fixed time relation with the amplified electromotive force produced by said amplifying means.

15. The combination in a clock of synchronous motor means for actuating the clock, an oscillator tuned approximately to the commercial power frequency for supplying power to said synchronous motor means, field sensing means to pick up electromotive force from the field of the commercial power distribution system in the area where the clock is located, means connected to said field sensing means for amplifying said electromotive force, and a connection between said amplifying means and said oscillator whereby to synchronize said oscillator in fixed time relation with the amplified electromotive force produced by said amplifying means.

16. The combination in a horological apparatus of means for actuating the apparatus and means to synchronize said actuating means with the low frequency of a power distribution system in the neighborhood of the apparatus without electric circuit connection therewith, said means comprising a field sensing means to pick up electromotive force from the field in space in the area where the apparatus is located produced by currents in said power distribution system, means for amplifying said electromotive force, and means to operate said means for actuating said apparatus in fixed time relation with the amplified electromotive force produced by said amplifying means.

17. The combination in a horological apparatus of means for actuating the apparatus, a field sensing element adapted to pick up an electromotive force of a frequency of a near-by power distribution system from the field in space in the area where the apparatus is located produced by said power distribution system, an amplifier connected between said field sensing element and said means for actuating the apparatus to amplify said electromotive force and supply it to said means for actuating the apparatus, whereby said apparatus operates in a fixed time relation to the frequency of said power distribution system without circuit connection therewith.

No references cited.